US007562368B2

(12) United States Patent   (10) Patent No.: US 7,562,368 B2
Kanevsky et al.   (45) Date of Patent: *Jul. 14, 2009

(54) UNIVERSAL DRIVER SERVER

(75) Inventors: Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/455,145

(22) Filed: Jun. 16, 2006

(65) Prior Publication Data

US 2006/0248541 A1   Nov. 2, 2006

Related U.S. Application Data

(63) Continuation of application No. 09/564,619, filed on May 4, 2000, now Pat. No. 7,089,562.

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................ 719/319; 719/313; 717/131; 709/219

(58) Field of Classification Search ......... 709/217–219, 709/245–246; 717/136–161; 719/310–320, 719/328–332
See application file for complete search history.

(56) References Cited

U.S. PATENT DOCUMENTS 5,895,477 A   4/1999  Orr et al.

(Continued)

FOREIGN PATENT DOCUMENTS

JP   PUPA 63-148472   6/1988

(Continued)

OTHER PUBLICATIONS

Cern, Cern Conversion Service—Mission STatement, p. 1 and User Guide, pp. 1-4, Jun. 1999.*

(Continued)

*Primary Examiner*—Meng-Ai An
*Assistant Examiner*—Diem K Cao
(74) *Attorney, Agent, or Firm*—Scully, Scott, Murphy & Presser, P.C.; Daniel P. Morris, Esq.

(57) ABSTRACT

This invention involves using an alternative driver that is located in a specified server on the Internet. For example, a person could take a floppy disk that is not compatible with their computer and transform it over the Internet through an alternate compatible driver. In order to do this, a special universal bit reader is located within the server. A second variant is that a bit reader would be located in a user's computer and it would be connected to a global server. So, all the files could be accessed through the Internet. This would allow to read and write data from/to a disk that was formatted on a different operational system. In order to solve a problem how to run applications that are not compatible to the operational system on a computer where this disk was inserted, the invention teaches the following approach. A universal driver on the server uses a program that looks for similar applications in a database server that contains a database of applications from different operational systems. The universal driver can identify what programs in the application are needed either reading names of programs on the disk or it can read a special table in which applications point to programs in different operational systems.

3 Claims, 4 Drawing Sheets

U.S. PATENT DOCUMENTS

| | | | |
|---|---|---|---|
| 6,049,671 A | 4/2000 | Slivka et al. | |
| 6,092,114 A | 7/2000 | Shaffer et al. | |
| 6,134,598 A | 10/2000 | Raman | |
| 6,141,681 A * | 10/2000 | Kyle | 709/206 |
| 6,145,084 A | 11/2000 | Zuili et al. | |
| 6,233,590 B1 | 5/2001 | Shaw et al. | |
| 6,549,918 B1 | 4/2003 | Probert et al. | |
| 6,674,767 B1 * | 1/2004 | Kadyk et al. | 370/466 |
| 6,802,056 B1 | 10/2004 | Chaiken et al. | |
| 2004/0031037 A1 | 2/2004 | Ikoma et al. | |

FOREIGN PATENT DOCUMENTS

JP     PUPA 9-69059     3/1997

OTHER PUBLICATIONS

IBM, "Generic Device Driver for Personal Computer Compact Disk Read-Only Memory," IBM Technical Disclosure Bulletin, Jan. 1994.

* cited by examiner

UNIVERSAL DRIVER SERVER

CROSS-REFERENCE TO RELATED APPLICATION

This application is a continuation application of U.S. patent application Ser. No. 09/564,619 filed May 4, 2000, now U.S. Pat. No. 7,089,562, the entire disclosure of which is hereby incorporated herein by reference in its entirety.

BACKGROUND OF THE INVENTION

1. Field of the Invention

The present invention relates to computer systems. More specifically, the invention relates to methods and procedures for allowing a computer to work with input data that is in a format nominally incompatible with the computer 2. Discussion of the Prior Art Today, computer systems, e.g., PC or Apple, are associated with many different processor types, e.g., Intel, Motorola, RISC, and include various operating system platforms, e.g., Windows, UNIX, OS/2 etc. Each of these computer system devices generally include a floppy disk drive or CD-ROM drive enabling a disk to be inserted into the system for reading data therefrom or data thereto. Typical problems that exist today largely deal with compatibility, where disks having programs readable and/or executable on one computing system platform, e.g., an Apple computer, may not be read or executed on another computing system platform. For example, if a student receives a game from one of his friends on a floppy disk who has a different computer system than his friends, that student would not be able to play the game because the software would not be compatible with his computer.

Some computer systems provide for the simulation of a disk driver of other, different operational systems. This requires the installation of software that enables a computer controlled with one operational system to read a floppy disk or CD-ROM that was formatted in another operational system. This solution is not very convenient since there are many other different operational systems and it takes a lot of memory to install many drivers for all existing operational systems into one computer. Also operational systems are often upgraded. Therefore, simulation of other operational systems on a PC may quickly become obsolete.

Another problem with simulators of other operational system drivers is that they allow only a limited number of operations, such as reading and writing files. They usually do not allow the execution of complex applications intended to be run on a different operational system.

Efforts have been made to create an operational system that is compatible with other operational systems (for example, Apple, UNIX, and Intel). So far, however, these efforts have not been completely successful due to the complexity of different operational systems. Furthermore, the platform-independent software approach, e.g., Java, enables the execution of applications that are written in Java to run on different operational systems, but still does not allow the reading of data from incompatible floppy/CD-ROM disks.

SUMMARY OF THE INVENTION

An object of the present invention is to provide an alternative compatible driver that is located in a specified server accessible via the Internet for transforming the incompatible data to a format compatible with the user's computer.

Another object of the present invention is to provide an alternative compatible driver employing a universal bit reader that is located in a specified server accessible via the Internet for transforming the incompatible data to a format compatible with the user's computer. Alternately, a bit reader could be located in a user's computer.

In accordance with the present invention, for example, a person could take a floppy disk that is not compatible with their computer and transform the disk over the Internet through an alternate compatible driver. In order to do this, a special universal bit reader is located within the server. A second variant is that a bit reader would be located in a user's computer, and the reader would be connected to a global server. So, all the files could be accessed through the Internet. This would enable users to read and write data from/to a disk that was formatted on a different operational system.

According to the principles of the invention, there is provided a web server employing a universal driver that enables execution of an application given on a disk, for example, that is not compatible with the operation system on the computer where the application is desired to be run or installed. A universal driver implemented in a server device implements a program that searches for similar applications in a database server that comprises many applications from different operation systems. The purpose of the search is to identify what programs in the application are needed, for example, by reading names of the incompatible programs on the disk. This is enabled by the fact that like programs for the same applications written for different operational systems usually have common prefixes.

Alternately, the driver may read a special table in which applications point to programs in different operational systems.

For example, if a computer game intended to run only on an Apple machine is attempted to be installed on an Intel based computer, the universal driver would go on the specified database server and download similar applications that are compatible for the user's computer. The universal driver can identify what programs in the application are needed either reading names of programs on the disk (the programs for the same applications written for different operational systems are usually have common prefixes) or it can read a special table in which applications point to programs in different operational systems. Advantageously, the system may be used with a computer game intended to run only on an Apple machine is attempted to be installed on an Intel based computer.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS OF THE INVENTION

The present invention is a universal driver apparatus 100 that enables a user to execute programs, generated on one computing platform, on another, incompatible computing platform.

Figure 1:
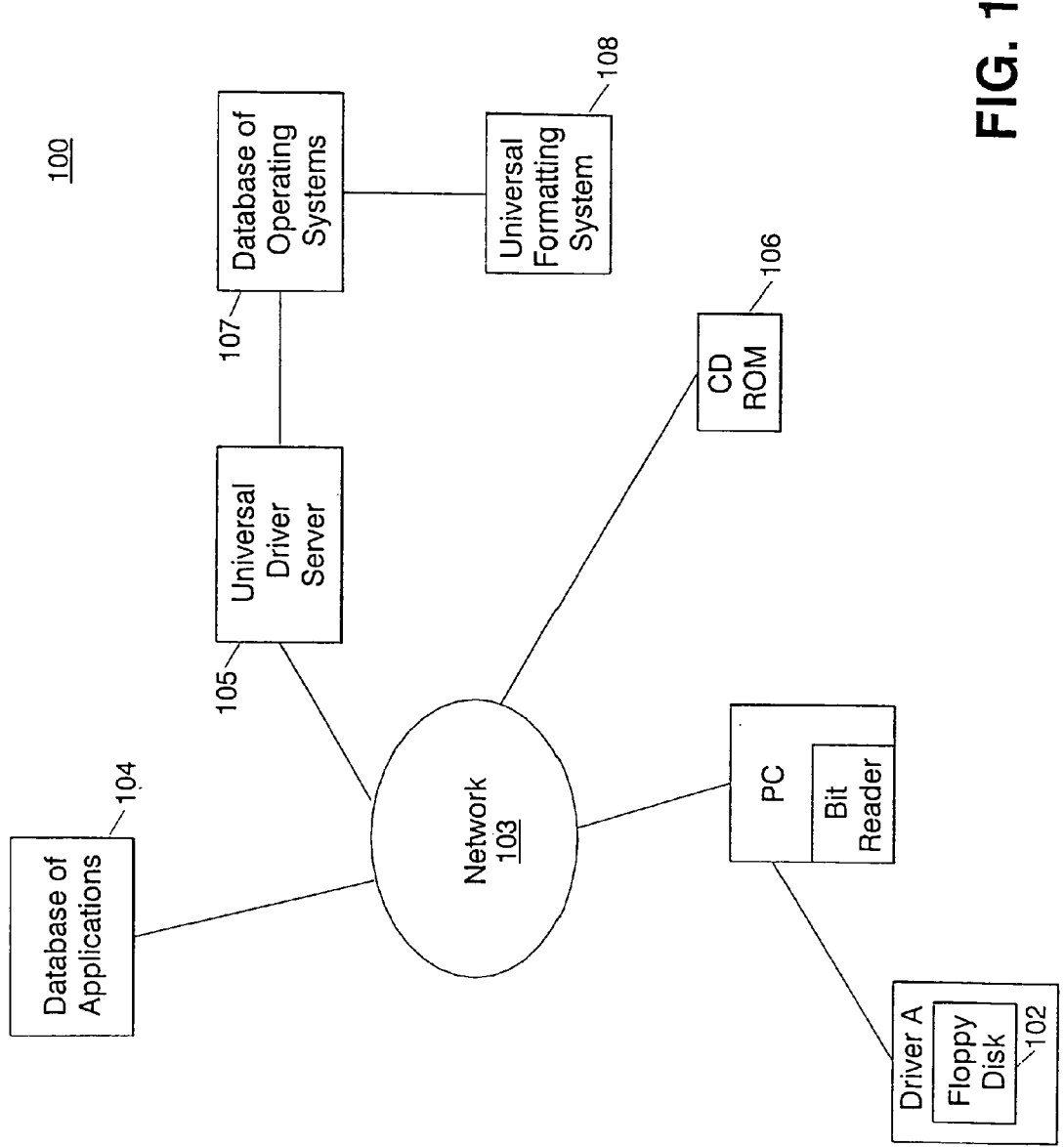
FIG. 1 describes the universal virtual floppy disk and CD-ROM driver.

FIG. 1 illustrates the universal driver apparatus incorporating a universal virtual floppy disk and CD-ROM driver. A first computing system includes a first driver A for reading and writing to a floppy disk 102. For purposes of discussion, the floppy disk 102 is assumed to have been formatted for use on an non-compatible operating system and is attempted to be run on the Driver A of the first computing system 101. As shown in FIG. 1, the PC includes a bit-reader 113. As the PC is unable to process the information on the disk the bit contents read by the bit reader are transmitted to the universal driver server 105 via network 103.

Based on the bits read, the universal driver 105 identifies in what operational system the disk 102 was formatted. The universal driver server 105 particularly activates a corresponding operational system from the database server 107 that contains different operational systems. Then, the universal driver performs some operations, such as read and write data from/to the disk 102 that was formatted on a different operational system or run applications on the disk 102 using the operational system on the server 107. The output from the running of the applications on 105 will be sent to the user on PC 101 after this output is reformatted to the user operational system. Of course, this approach cannot be used if the task of application is not to produce some output file (e.g. a music or text).

If the user would like to download files from 102 to a memory in the computer 101 then he can format files on the disk 102 into a format that is compatible with the operational system in 101. This reformatting is done in the universal formatting system that is described in the patent application Ser. No. 09/564,617, filed herewith, for "Real Time Backup System For Computer Users". For example, the person may want to store ASCII file from the disk 102 to the computer 101. ASCII data has different representation in different operational systems (for example, 4 bytes numbers A1 A2 in Intel are represented as A2 A1 in Unix, where A1 and A2 are two byte numbers). Examples of simple applications that can be run on PC after they were reformatted from the disk 102 in 108 are programs that are written as scripts that do not require compilations (e.g. perl script).

The universal driver also can download some special applications directly to the PC 101 if these applications can be run on PC in 101 (despite the fact that PC 101 is controlled by a different operational system). Examples of such application are programs that are written as scripts. For example, Perl script that was written for one operational system usually can be run in different operational systems (with little or no changes) that contain means for running Perl scripts. Perl source is represented as a text file (e.g. ASCII) and to run it in another operational system, only small changes may be needed.

In order to run more complex applications that are not compatible with the operational system on a computer, where this disk was inserted, the invention teaches the following approach. A universal driver 105 on the server uses a module that looks for similar applications in a database server 104 that contains a database of applications from different operational systems. For example, if a computer game only compatible for apple was trying to be installed into an Intel computer, the universal driver would go on the specified database server and download similar applications that are compatible for the user's computer. The universal driver can identify what programs in the application are needed, either reading names of programs on the disk (the programs for the same applications written for different operational systems usually have common prefixes), or the universal can read a special table in which applications point to programs in different operational systems.

Figure 2:
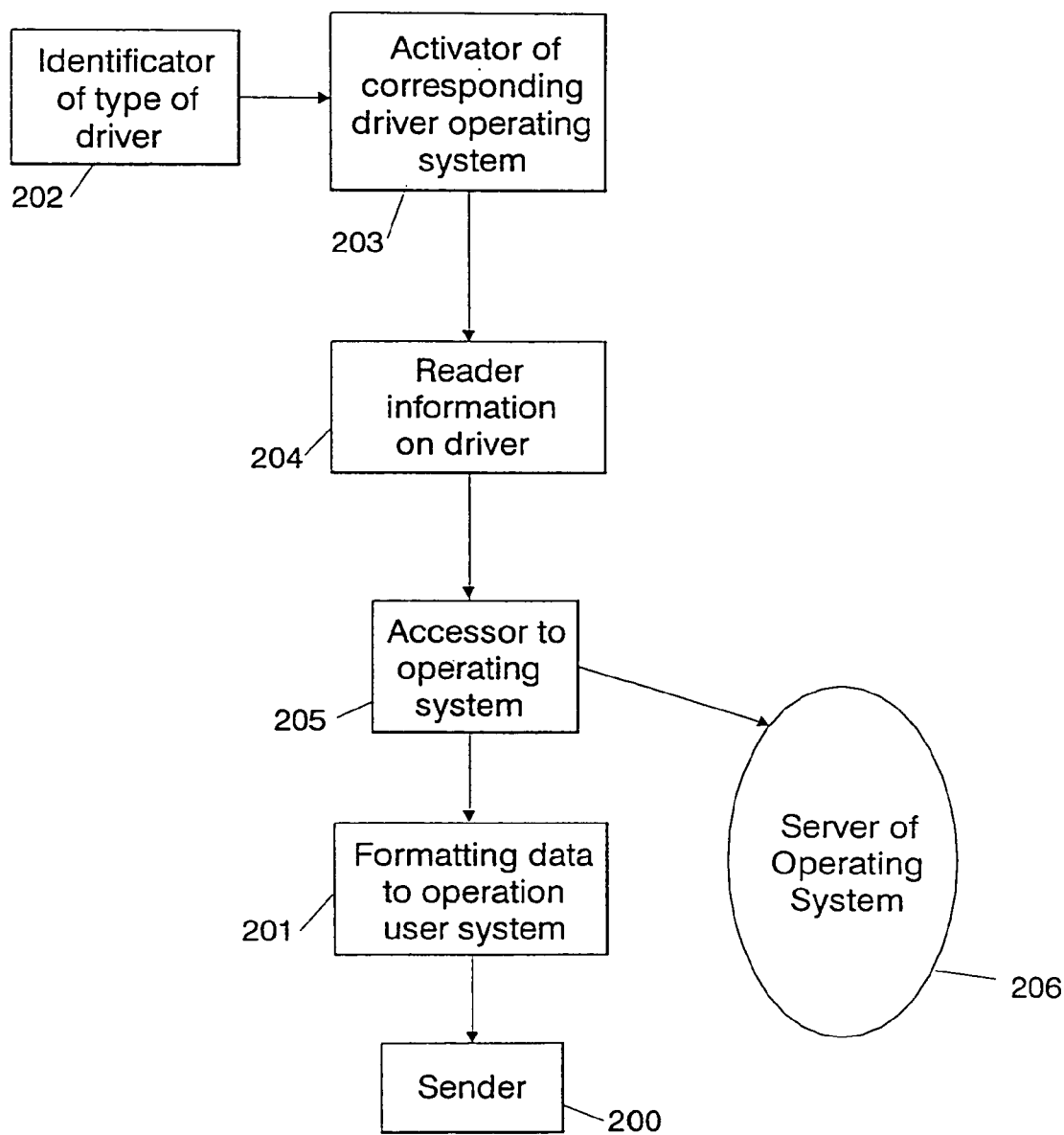
FIG. 2 is a flow chart depiction of the driver setup process according to the principles of the invention.

FIG. 2 explains the setup drivers. After the identifier of the type of driver 202 distinguishes what type of operating system the data program was meant for, the data is sent to 203, where the data is recognized by an activator of corresponding driver operational systems. This means, when the compatible system for the data is found, the data are connected to that driver. For example, if a program was only compatible with Apple, the server would identify that and then connect the program to an Apple driver. For the data to be connected with the correct driver, the data must process through the reader information in the driver 204. After the data is read, the data are sent to the access of the operation system 205. This is all sent to the server of operating system, where the changes can take place. 201 is responsible for formatting data to an operating user system. Then, this information is sent back to the user/sender 200 in the usable format.

Figure 3:
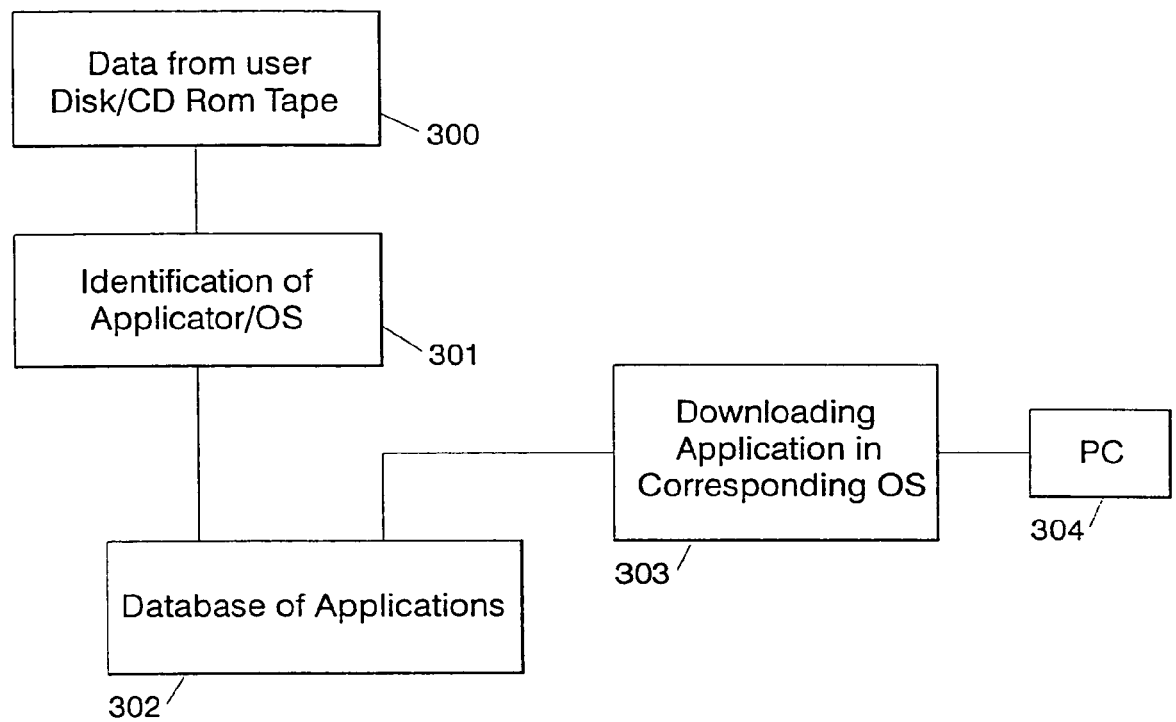
FIG. 3 is a detailed flow chart depicting the data formatting step 201 of FIG. 2.

FIG. 3 explains some of work that is done in the module "formatting of data" 201. The data from a user (disk, CD-ROM, and tape) 300 is sent to the identifier of application OS 301. The data base of Applications 302 is where 301 searches for programs that are compatible with the ones in need of format. If a compatible program is found, that program is then downloaded into the corresponding operating system 303. The compatible program is finally downloaded into the user's computer 304.

Figure 4:
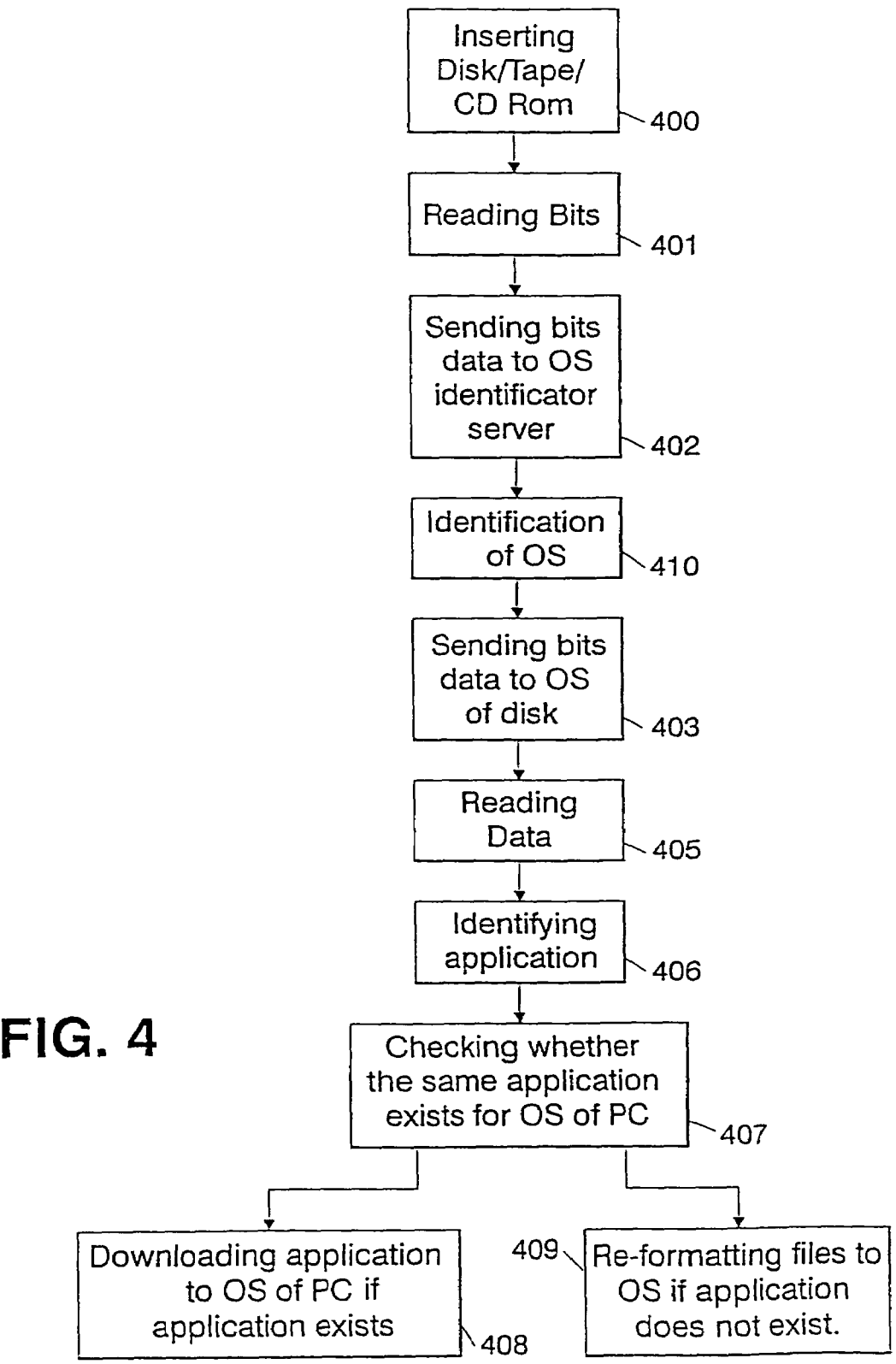
FIG. 4 is a flowchart of the universal driver method according to the invention.

FIG. 4 is a flowchart of the method. At 400, first a disk, CD-ROM, or tape is inserted into the PC. At 401, the bits are read. At 402, the bits are sent to the operating system's identification server 410. At 403, the bits are sent to the operating system of the inserted disk, tape, or CD-ROM. At 405, the data are read. At 406, the method identifies the type of application. At 407, the method checks whether the same application exists for OS of the PC. At 408, the method downloads any compatible files, if they exist. At 409, the method reformats the files to OS of the user's computer, if the application does not exist in another OS.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure the Letters Patent is:

1. A computer system comprising:
   a computer located at a first site and including a central processing unit (CPU), a driver, a memory, and a first operating system for operating said computer, said memory including a universal bit reader, and said driver including input means for receiving an input data file in a format that is compatible with a second operating system and non-compatible with the first operating system; and
   a universal driver server located at a second site remote from the first site, connected to the memory of the computer via a network, and including a series of programs in a format compatible with the first operating system; wherein the CPU includes processes for using the bit reader to read said non-compatible input data file and transmitting said input data file, in bit form, to the universal driver server via the network; and wherein the universal driver server includes means for receiving the transmitted input data file, and a process for (i) based on bits read in the received data file, identifying the second operating system, (ii) activating a corresponding operating system, corresponding to said second operating system, on the universal driver server, and (iii) performing operations on the received data, said operations including read/write operations to/from a disk, to make the data in the received data file compatible with the first operating system;
   wherein the universal driver server includes (i) a universal bit reader, (ii) an applications database including a plurality of applications in a plurality of formats compatible with a plurality of operating systems, (iii) an OS database having a plurality of operating systems, and (iv) a table identifying a plurality of applications pointing to programs formatted in different operating systems; and
wherein the universal driver server
a) sends the bits from the user computer to an operating system identifier to identify the first operating system;
b) activates an operating system, corresponding to said first operating system, from the OS database;
c) activates a driver having said corresponding operating system;
d) reads data from and writes data to said disk;
e) runs a given application on the disk using said corresponding operating system to generate an output file, including the step of sending data from the given application to the activated driver;
f) processes the data from the given application through a reader information unit in the activated driver to read the data;
g) after the data are read, sends the data to an accessor;
h) reformats said output file to be compatible with the second operating system;
i) sends the reformatted output file to the user computer; and
j) searches the applications database for one or more programs of the given application in a format or formats compatible with the second operating system.

2. A method of operating a computer system, comprising the steps of:
first, inserting a disk, CD-ROM, or tape having a given software application into a personal computer located at a first site and having a first operating system, the given software application being incompatible with the first operating system;
reading bits of the given software application; sending the bits to an operating system identification server;
sending the bits to a universal driver server located at a second site remote from the first site, and including a second operating system that is compatible with the given software application on the inserted disk, tape, or CD-ROM;
the universal driver server,
reading the bits;
on the basis of the read bits, identifying the given software application and said second operating system;
checking an application database to determine whether an application that is the same as the given software application exists in said application database for the first operating system;
if said same application exists, downloading said same application from the second site to the first site; and
if said same application does not exist, using the read bits to reformat reformatting files of the given application to be compatible with the first operating system; and
wherein the universal driver includes (i) a universal bit reader, (ii) an applications database including a plurality of applications in a plurality of formats compatible with a plurality of operating systems. (iii) an OS database having a plurality of operating systems, and (iv) a table identifying a plurality of applications pointing to programs formatted in different operating systems, and wherein said method comprises the further step of using the universal driver server to:
a) send the bits from the user computer to an operating system identifier to identify the first operating system;
b) activate an operating system, corresponding to said first operating system, from the OS database;
c) activate a driver having said corresponding operating system:
d) reads data from and writing data to said disk; and
e) run the given application on the disk using said corresponding operating system to generate an output file, including the step of connecting data from the given application to the activated driver.

3. A program storage device readable by machine, tangibly embodying a program of instructions executable by the machine to perform method steps for operating a computer system, the method steps comprising:
receiving data, which forms a given software application, input into a personal computer located at a first site and having a first operating system, said input data being incompatible with the first operating system and including a multitude of bits;
using a universal driver server, located at a second site remote from the first site, for
reading the bits;
on the basis of the read bits, identifying the given software application and said second operating system;
checking an application database to determine whether an application that is the same as the given software application exists in said application database for the first operating system of the personal computer;
if said same application exists, downloading said same application from the second site to the first site; and
if said same application does not exist, using the read bits to reformat files of the given application to be compatible with the first operating system;
wherein the universal driver includes (i) a universal bit reader, (ii) an applications database including a plurality of applications in a plurality of formats compatible with a plurality of operating systems, (iii) an OS database having a plurality of operating systems, and (iv) a table identifying an a plurality of applications pointing to programs formatted in different operatin systems, and wherein said method steps include the further step of using the universal driver server to:
a) send the bits from the user computer to an operating system identifier to identify the first operating system;
b) activate an operating system, corresponding to said first operating system, from the OS database;
c) activate a driver having said corresponding operating system;
d) read data from and write data to said disk; and
e) run the given application on the disk using said corresponding operating system to generate an output file, including the step of connecting data from the given application to the activated driver.

* * * * *